United States Patent Office 3,642,902
Patented Feb. 15, 1972

3,642,902
ALLYLAMINES FROM π-ALLYLPALLADIUM COMPLEXES
Hartwig C. Bach and Helmuth E. Hinderer, Durham, N.C., assignors to Monsanto Company, St. Louis, Mo.
No Drawing. Filed Dec. 24, 1968, Ser. No. 786,768
Int. Cl. C07c 85/00, 85/02
U.S. Cl. 260—585 R
4 Claims

ABSTRACT OF THE DISCLOSURE

Allylic amines have been prepared by a synthesis which involves the reaction of ammonia, primary or secondary amines with π-allyl palladium complexes.

This invention relates to a synthesis of allyl amines.

More particularly, the instant invention relates to a method for preparing allyl amines by reaction of ammonia, a primary amine or a secondary amine with a π-allyl palladium complex.

According to the synthesis of this invention ammonia, primary and secondary amines can be reacted with π-allyl palladium complexes according to the following reaction scheme to prepare allylic amines:

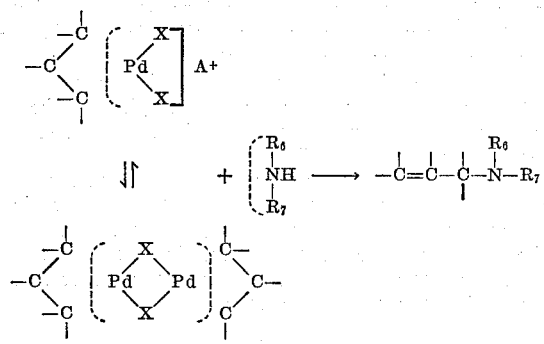

wherein the π-allyl palladium complexes, hereafter more fully defined, are contacted with ammonia, a primary or secondary amine to produce the amine corresponding to the substitution product of the ammonia or amine reactant and the olefin from which the palladium complex is prepared. The reaction may be conducted with a π-allyl palladium complex which has been isolated or it may be conducted by adding ammonia or an amine to a reaction mixture containing the π-allyl palladium product.

π-Allyl palladium complexes have been reported in the literature and have been found useful as chemical intermediates and catalysts. The π-allyl palladium complexes employed in the reaction of this invention may be represented by the formulas below where Formula I represents a mononuclear π-allyl palladium complex and Formula II represents a binuclear π-allyl palladium complex, the products normally being formed as an equilibrium product.

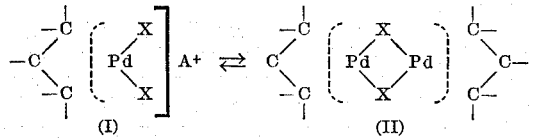

(I)      (II)

wherein the organic precursor is a compound having no ionic substituents and having an allylic hydrogen atom,

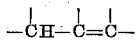

X represents a coordinating anion and A+ represents a cation such as hydrogen, lithium or complexes thereof.

When such allylic compounds are complexed as π-allyl ligands with the palladium ion each of the three carbon atoms contribute electrons to the bond between the palladium ion and the allyl ligand. This type of electron contribution is believed to result in a much stronger bond than normally found in other organometallic complexes. Although the complexes employed by the process of this invention have been prepared by a variety of syntheses, including the reactions of allylic olefins with palladium salts, the π-allyl complexes were frequently difficult or practically impossible to isolate in high yields. The use of solvents such as acetic acid as a reaction medium results in decreasing yields and difficulty in isolation of the products to the extent that the reaction of olefins to form π-allyl complexes were of little practical use for commercial purposes. In copending application Ser. No. 748,-221 filed July 29, 1968 there is disclosed an improved method for the formation and isolation of π-allyl palladium complexes which involves the reaction of allylic olefins with palladium salts in a basic amide solvent. The invention of the cited copending application has been found to be advantageous because the reactants are generally available and the product is formed in relatively high yields and, if desired, the products can be isolated from the reaction mixture in highly pure form.

Thus, a convenient process for the formation of π-allyl palladium complexes which may be employed in the process of this invention may be represented by the following general equations:

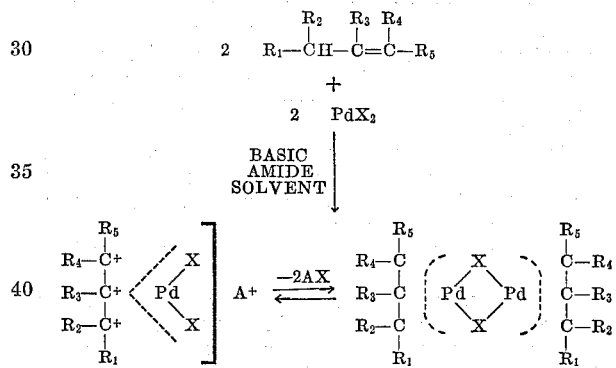

wherein $R_1$, $R_2$, $R_3$, $R_4$ and $R_5$ may be the same or different non-ionic aliphatic, alicyclic or aromatic radicals or hydrogen, X represents a coordinating anion such as a halide, acetate and the like and, A+ represents a cation or complex thereof. The product of the above reaction is an equilibrium product which when prepared according to the instant invention can conveniently be shifted to the formation of a binuclear π-allyl palladium complex where isolation of the complex is desired. In this respect, partial or complete neutralization is conveniently achieved by adding a stoichiometric amount of ammonia or a tertiary amine. The degree to which the binuclear π-allyl palladium complex is formed initially without extraneous neutralization of the acidic byproduct is somewhat dependent on the particular olefin used and the basicity of the amide solvents employed as the reaction media. As indicated ammonia or tertiary amines such as pyridine, triethylamine, or n-methylpyrrolidone can conveniently be employed for neutralization in an amount necessary to partially or completely tie-up the protons existing in the reaction system. Additionally, where isolation of the binuclear π-allyl palladium complex product is intended, it may be desirable to conduct the reaction in the presence of a neutralizing agent in order to shift the equilibrium to the right during the course of the reaction. The effect of adding tertiary amines may otherwise be explained in terms of pH control. It appears that highest yields of the binuclear product are normally achieved at a pH of around 7.

Where ammonia is employed to shift the equilibrium product of the π-allyl palladium complex by neutralization as above indicated it should not be employed in excess of the amount necessary to tie up existing cations during the reaction insofar as side reactions appear to occur which reduce the yield of the desired complex. As a general rule it is highly desirable to allow the reaction of allylic and palladium salt reactants to reach completion prior to neutralization.

The critical characteristics of the olefin employed in the formation of π-allyl complex according to this invention is that it possesses an allylic hydrogen atom or otherwise stated the organic reactant must have at least one hydrogen atom on a saturated carbon atom directly adjacent to an olefinically unsaturated carbon atom. Compounds of this type are classic and are typically represented by the various straight and branched chain aliphatic olefins, various unsaturated alicyclic compounds and various alkenyl aromatic compounds, including hydrocarbons such as propene, butene, isobutene, pentene, hexene, cyclohexene, alpha-methylstyrene, cyclohexene, cyclopentene, 3-methylbutene-1, 3-phenyl butene-1, 3-phenyl propene, 1, 5-hexadiene and the like. Additionally, the allylic reactants may contain various non-ionic substituent groups which are not reactive with palladium salts such as halides, ethers, esters, ketones and aldehydes representative of which are 4 - chloro-3-methylbutene-1, 3-carbomethoxy-propylene, 2 - methyl-2-(4-nitrophenyl)-ethylene and the like. The term "non-ionic olefin having an allylic hydrogen atom" is herein intended to include unreactive compounds bearing such substituents.

The palladium compounds useful in forming π-allyl complexes employed in the instant invention are palladium salts of coordinating anions. They include halides such as chloride, bromide and iodide, carboxylates such as the acetates, propionates and others known to those skilled in the art.

While it is not essential to this invention the palladium salts employed herein may be used in the form of complexes with other materials. For example, a complex of palladium chloride with benzonitrile or lithium chloride may be employed with the same effect as palladium chloride.

While not essential to the formation of allyl amines the reaction above described for the formation of π-allyl palladium complexes is greatly improved by conducting the reaction in the presence of a basic amide solvent. The solvents which may be employed in the preparation of π-allyl complexes may be aliphatic, aromatic or heterocyclic in structure and may be represented by the following formula:

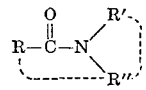

wherein R, R' and R" are radicals selected from the group consisting of hydrogen, alkyl, phenyl and R and R" or R' and R" when linked together may represent an alkylene radical with the proviso that R, R' and R" represent less than 12 carbon atoms. These solvents include materials such as acetamide, N-methylbenzamide, N,N-dimethylformamide, N,N - dimethylacetamide, N,N - dimethylpropionamide, N - methylpyrrolidone, N-ethylpyrrolidone, hexamethylphosphoramide and the like. In the preparation of π-allyl palladium complexes above indicated the order of addition of reactants has not been found to constitute a critical aspect of the process. In one mode the palladium salt may be dissolved in a basic amide solvent and the olefin thereafter added to the solution. Alternatively, the palladium salt may be added to a saturated basic amide solution of olefin. In either case the olefin should be employed in at least equimolar concentrations or greater with respect to the palladium salt to insure complete utilization of the more expensive of the two reactants.

The temperature employed in the preparation of π-allyl palladium complexes depend somewhat upon the result desired and range from about 20° C. up to about 250° C. The reaction proceeds more rapidly at temperatures above 60° C. and where product isolation is desired temperatures for the reaction may range up to the decomposition point of the particular π-allyl complex, pressure being employed where necessary to maintain the solvent in a liquid state. As the temperatures employed in the reaction exceed about 120° C. the equilbrium product begins to decompose, the temperature of decomposition being dependent on the particular reaction system. Where palladium chloride is used as a reactant material the decomposition product corresponds to the halogen substituted analog of the allylic reactant, halogen being substituted for the allylic halogen atom.

It has been observed that the reaction proceeds somewhat more rapidly at a higher temperature range, generally, without adverse affect on either the yield or purity of the π-allyl complex.

As the π-allyl palladium complex is formed portions thereof may precipitate from the reaction mixture and where isolation of the product is desired the reaction mixture may be neutralized as above indicated to increase the product precipitation, whereupon the product can be filtered and washed with water. If isolation of the product is not desired, the volume of the reaction mixture can be increased by use of additional solvent or decreased by removal of solvent under vacuum. The amount of solvent employed is not found to be critical so long as there is sufficient solvent to at least partially dissolve the reactants and to allow adequate contact between reactants.

In order to minimize side reactions which may have a deleterious effect on both the purity and yield of the π-allyl complex its preparation should be conducted at essentially anhydrous conditions.

The nitrogen containing compounds employed in the preparation of allyl amines according to this invention are those having at least one active hydrogen atom attached to a nitrogen atom. These include ammonia, primary and secondary amines which may be represented by the following structural formula:

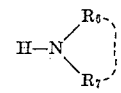

wherein $R_6$ and $R_7$ may be hydrogen, any aliphatic, alicyclic or aromatic radical or where $R_6$ and $R_7$ may represent a divalent radical which forms a nitrogen containing heterocycle as indicated by the dotted line. Among such radicals are various straight and branched chain alkyl radicals, cycloalkyl radicals and aromatic carbocyclic and heterocyclic radicals which may include any substituent which is unreactive with the π-allyl palladium complex. Such unreactive substituents include halides, ether groups, ester groups, ketone groups, nitro groups and the like. Exemplary of the amines which may be employed in the process of this invention are ammonia, ethylamine, n-propylamine, aniline, N-methyl aniline, diethylamine, dibutylamine, methylethyl amine, cyclohexylamine and piperidine.

Allyl amines are prepared according to this invention by contacting the π-allyl palladium complex in solution with ammnoia, a primary or secondary amine at a temperature below the decomposition temperature of the π-allyl palladium complex and, preferably, at a temperature ranging from about 0° C. to about 100° C. It is desirable to stir the reaction mixture during the course of the reaction to insure adequate contact between the reactants in solution. The progress of the reaction may conveniently be followed by a vapor phase chromatographic analysis to the point of completion. The reaction medium must be one which completely or partially dissolves one or both of the reactants.

Although the π-allyl palladium complex may be isolated and thereafter reacted with an appropriate amine in solution it has been found most convenient to add the amine to the reaction mixture containing the π-allyl palladium complex in an amount sufficient to insure complete reaction of the more expensive π-allyl palladium complex. Thus, while neither the order of addition of the reactants nor the amount of either reactant has been found to be critical the process is most conveniently conducted by adding a small excess of the amine to the π-allyl palladium complex in solution.

Upon completion of the reaction the allyl amine product and any excess amine may be separated from the reaction mixture by fractionation. Additional solvent may be added to the fractionated residue, if necessary, and the palladium catalyst regenerated by oxidation. The preparation of the π-allyl complex and the allyl amine therefrom may then be repeated in a manner previously described. Thus, the present invention is readily adaptable to a continuous process by means of recycling the reaction residue after separation of excess amine and the allyl amine product. Best results are achieved where the pH of the solution of the π-allyl palladium complex is adjusted to about 7 prior to addition of ammonia or amine reactants.

Solvents suitable for use in the preparation of allyl amine are most conveniently those employed for the preparation of the π-allyl palladium complex as above described.

The amine products of the process herein described are useful in a variety of organic syntheses and as monomers for the preparation of vinyl polymers having reactive amine sites along the polymer chain.

The following examples are provided to further illustrate the process of this invention and are not intended to establish limits thereof.

EXAMPLE I

Preparation of N,N-dimethyl-2-phenyl-allylamine

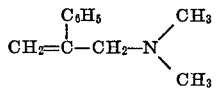

2 ml. of a 20% (by weight) solution of dimethylamine in dimethylacetamide (DAMc) were added at 0° C. to 0.518 g. (0.001 mole) of bis(2-phenyl-π-allylpalladium chloride). The mixture was stirred at 0° C. for 2 hours, then at ambient temperature for an additional 2 hours. The title compound was obtained in 92% yield. It was isolated by preparative vapor phase chromatography and identified by NMR.

EXAMPLE II

Preparation of N,N-dimethyl-allylamine

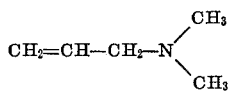

Bis(π-allylpalladium chloride) (10.98 g., 0.03 mole) was added at 0° C. to a solution of 9.34 g. (0.21 mole) of dimethyl amine in 45.3 g. of DMAc. The mixture was stirred at 0° C. for 3½ hours. The title compound was obtained in 76% yield. It was isolated by preparative gas chromatography and characterized by NMR and IR in comparison with an authentic sample.

EXAMPLE III

Preparation of N-allyl-N-methyl-aniline

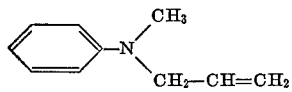

A mixture of 3.67 g. (0.01 mole) of bis(π-allylpalladium chloride), 3.54 g. (0.033 mole) of N-methyl aniline and 20 ml. of DMAc was stirred at 51–54° C. for 19 hours. During the reaction the precipitation of palladium metal was observed. The title compound was obtained in 57% yield. It was isolated by preparative gas chromatography and characterized by NMR and IR.

EXAMPLE IV

Preparation of triallylamine

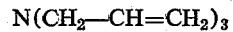

Allylamine (250μ) was added at 25° C. to 750μ of a solution of 0.183 g. (0.5 mole) of bis(π-allylpalladium chloride) in 5 ml. of DMAc. The mixture was heated to 140° C. for an hour and 15 minutes. A 28% yield of triallylamine was obtained; the compound was characterized by comparison with an authentic sample.

Triallylamine was also identified as one of the products of the reaction at 50° C. of ammonia with a solution of bis (π-allylpalladium chloride) in DMAc.

EXAMPLE V

Preparation of allyl aniline

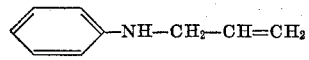

A solution of 3.51 g. (0.038 mole) of aniline and 3.66 g. (0.01 mole) of bis(π-allylpalladium cholride) in 20 ml. DMAc was stirred at 50–52° C. for 4½ hours. Precipitation of palladium metal was observed. The title compound was obtained in 23% yield. It was isolated by preparative gas chromatography and characterized by NMR.

EXAMPLE VI

Preparation of N,N-dimethyl-3-phenyl-allyl amine

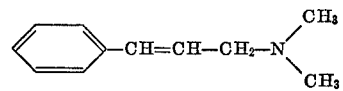

At 0° C., 1.7 ml. of a 15.9% (by weight) solution of dimethyl amine in dimethylacetamide was added to 0.518 g. (0.001 mole) of bis(1-phenyl-π-allyl palladium chloride) (prepared according to the procedure given in our copending application Ser. No. 748,221). The mixture was kept at 0° C. for 2 hrs., at ambient temperature for 22 hrs. A 46.5% yield of N,N-dimethyl-3-phenyl-allyl amine was obtained (determined by quantitative gas chromatography). In a similar experiment the title compound was isolated by preparative gas chromatography and identified by nuclear magnetic resonance spectroscopy. Only traces of the isomeric N,N-dimethyl-1-phenyl-allyl amine were found in the reaction mixture.

As illustrated in the preceding example reaction of ammonia or an amine preferably occurs on the carbon atom of the π-allyl ligand which is less sterically hindered. More particularly, in the formula below the reaction of ammonia or an amine will occur on carbon atom I or II, whichever is less sterically hindered.

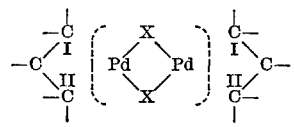

Thus where there is a bulky group, such as phenyl attached to the carbon atom designated I as in Example VI then the reaction will preferably occur on carbon atom II.

As earlier indicated the synthesis of allyl amines according to the reaction of this invention is a general reaction and although the reaction has been particularly described with respect to π-allyl palladium complexes derived from monoolefins and the reaction thereof with monoamines it will be readily apparent to those skilled in the art that the reaction can be employed with complexes formed from diolefins as well as using diamines to prepare polymers having interlinear amine groups. Such polymers can be used in the preparation of acid dyeable fibers and films.

We claim:
1. A liquid phase process for preparing allylic amines which comprises reacting a π-allyl palladium complex with ammonia or an amine having a reactive hydrogen atom attached to the amine nitrogen atom at a temperature below the decomposition temperature of said complex, said process being conducted in a liquid selected from the group consisting of said amine and a solvent of the formula

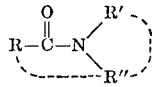

wherein R, R' and R" are selected from the group consisting of hydrogen, alkyl and phenyl with the proviso that where either R or R' is linked to R" then R and R" or R' and R", respectively, form an alkylene radical, and wherein the sum of carbon atoms in R, R' and R" is less than 12.

2. The novel synthesis of claim 1 wherein the synthesis is conducted in the presence of a basic amide solvent at a pH of at least about 7.

3. The novel synthesis of claim 1 wherein the basic amide solvent is selected from the group consisting of acetamide, N-methylbenzamide, N,N-dimethylacetamide, N,N-dimethylformamide, N,N-dimethylpropionamide, N-ethyl pyrrolidone, N-methyl pyrrolidone and hexamethylphosphoramide.

4. The process of claim 1 wherein a solution of π-allyl palladium chloride in said solvent is contacted with ammonia to yield allylamine.

References Cited
UNITED STATES PATENTS

| | | | |
|---|---|---|---|
| 3,147,310 | 9/1964 | Brois et al. | 260—583 |
| 3,277,182 | 10/1966 | Pampus et al. | 260—583 |

CHARLES B. PARKER, Primary Examiner

R. L. RAYMOND, Assistant Examiner

U.S. Cl. X.R.

260—293, 429, 570.8, 577, 583 H